March 26, 1963 D. C. WELLER 3,083,267

PCM TELEPHONE SIGNALING

Filed Oct. 20, 1960 3 Sheets-Sheet 1

INVENTOR
D. C. WELLER
BY R. B. Anderson
ATTORNEY

INVENTOR
D. C. WELLER
BY R. B. Anderson
ATTORNEY

FIG. 3

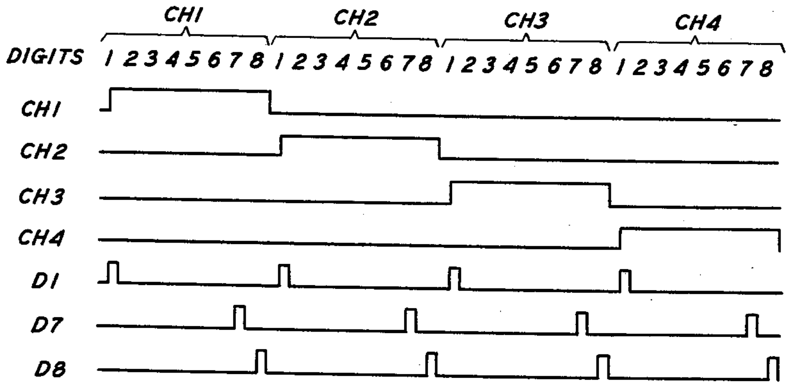

FIG. 4

| ORIGINATING OFFICE ⟶ TERMINATING OFFICE | | | |
|---|---|---|---|
| CONDITION | D8 | SIG RELAY | MEANING |
| OPEN LOOP | 0 | RELEASED | IDLE |
| CLOSED LOOP | 1 | OPERATED | BUSY |

FIG. 5

| TERMINATING OFFICE ⟶ ORIGINATING OFFICE | | | | | |
|---|---|---|---|---|---|
| CONDITION | D7 | SUP RELAY | D8 | RP RELAY | MEANING |
| NORMAL BATTERY (-T) | 0 | RELEASED | 1 | OPERATED | ON-HOOK |
| REVERSED BATTERY (-R) | 1* | OPERATED | 1 | OPERATED | OFF-HOOK |
| SHORT CIRCUIT | 0 | RELEASED | 0 | RELEASED | REVERTIVE PULSE |

* RANDOMLY PRESENT

INVENTOR
D. C. WELLER
BY R. B. Ardis
ATTORNEY

United States Patent Office 3,083,267

Patented Mar. 26, 1963

3,083,267

PCM TELEPHONE SIGNALING

David C. Weller, Sparta, N.J., assignor to Bell Telephone Laboratories, Incorporated, New York, N.Y., a corporation of New York Filed Oct. 20, 1960, Ser. No. 63,737
10 Claims. (Cl. 179—15)

This invention relates generally to pulse type communication systems and more particularly, although in its broader aspects not exclusively, to time division multiplex pulse code modulation systems for use between telephone central offices in the so-called exchange area.

When a number of metallic-pair voice-frequency telephone transmission lines are replaced by a single multichannel carrier trunk, each carrier channel must, if it is to be fully compatible with the associated switching equipment, be capable not only of carrying the same message information but also of passing the same form of signaling information as the voice pair it replaces. It should, in other words, accept both voice messages and signaling information in the same form that they would have if they were to be impressed upon a metallic pair and should reproduce both in substantially the same form at the other end of the line if need for alterations in the associated switching equipment is to be avoided. A number of techniques are known for transmitting signaling information over the respective channels in conventional frequency division multiplex carrier systems, but they are generally not readily applicable to time division multiplex systems of the pulse code modulation type. Those that are applicable tend to be so only at the cost of a considerable increase in circuit complexity because of duplication of functions.

Signaling in a telephone system may conveniently be divided into the two broad classifications of supervisory and control signaling. The first permits a subscriber or an operator to initiate a request for service, holds or releases a connection after it has been established, or recalls an operator on a previously established connection. The second permits information to be passed over the line to direct the establishment of a particular desired connection. Since, at least between central offices in the exchange area, the type of signaling generally encountered that places the most stringent requirements on the system is a form of control signaling known as revertive pulsing, it is to revertive pulsing that the description of the present invention is primarily directed. The principles underlying the invention are, of course, applicable to other forms of signaling as well, particularly to others based upon the rapid transmission of pulse information in either one or both directions over the trunk.

Revertive pulsing between telephone central offices owes its existence to the nature of the operation of certain types of central office switching equipment. Some switching devices, notably panel selectors, are driven by their own power over banks of terminals and signal their position by producing pulses as the respective terminals are passed over. In each such installation, these pulses are counted and the switch is stopped when the desired position is reached. The operation of such equipment from a central office at the remote end of a trunk is known as revertive pulsing since that office controls the setting of the switches by means of pulses which "revert" back over the trunk. The central office at which the call originates generates only start and stop indications in the form of busy and idle signals.

In general, revertive pulsing trunks originate calls only in one direction. The central office at which the call is initiated is termed the originating office, while that at which the call is received is known as the terminating office. The terminating office normally supplies the originating office with a negative voltage known as "battery" on the so-called tip side of the line and ground on the so-called ring side to indicate an on-hook condition at the terminating office. The originating office transmits a start signal by becoming busy, causing current to flow in the terminating office. The terminating office then sends back momentary short circuits or ground pulses as its switching equipment passes over its terminal contacts. When the proper number of ground pulses have been received, the originating office transmits a stop signal by becoming idle and interrupting the flow of current. The switching equipment at the terminating office then advances to the next selector and the sequence is repeated as often as necessary until the called number is reached. When the called subscribed answers his telephone, the terminating office reverses the polarity of the direct voltage supplied to the originating office, placing ground on the tip side of the line and battery on the ring side.

In any multichannel carrier multiplex system, it is clearly not possible to transmit such two-state direct-current signals directly over the facility between central offices without modification. Direct currents and voltages cannot conveniently be transmitted and it is important that each channel be able to signal independently of and without disturbance to the others. In conventional frequency division multiplex systems, it is common to transmit signaling information by either pulsing the amplitude or shifting the frequency of one or more tones which are either within or just outside of the voice-frequency band and using them to modulate the carrier in the same manner as do the regularly transmitted speech waves. Application of such techniques to a time division multiplex pulse code modulation system, however, would tend to require a large amount of equipment in each channel for the generation and control of the tones prior to coding.

A principal object of the present invention, therefore, is to transmit signaling information over a multichannel pulse code modulation telephone system with a maximum of speed and with a minimum of circuit complexity.

A closely related object is to transmit signaling information over a multichannel pulse code modulation telephone system without degrading voice-frequency message transmission during the commercial portions of telephone calls.

In accordance with one important feature of the invention, two-state direct-current signaling information is transmitted over a multichannel pulse code modulation message transmission system employing a predetermined number of digit spaces per channel for message transmission by adding a further digit space to each channel exclusive of the message digit spaces and transmitting binary "1" in the added digit space in response to one state of the direct-current signal and binary "0" in response to the other state. The original direct-current signaling state is reconstructed at the opposite end of the system in the corresponding channel in response to the content of the added digit space. Signaling information is, in this manner, transmitted rapidly over the pulse code modulation system with a minimum of additional circuitry and with no interference between channels. Since the added digit space is not one of those required for message transmission, there is, moreover, no accompanying degradation in the quality of message transmission. The principal cost is a relatively small increase in system bandwidth requirements.

While a single signaling path per channel is adequate to meet most telephone signaling requirements, it is still not of itself sufficient to permit revertive pulsing. While a revertive pulsing trunk needs only one signaling path in the outward direction, to transmit idle or busy signals, it requires two signaling paths in the opposite or inward direction, one to transmit revertive pulses and the other to transmit on-hook or off-hook signals. This invention, in addition to providing a single high-speed signaling path in each direction in the manner described above, also furnishes a second signaling path which is available for use in the inward direction to meet the requirements for revertive pulsing.

According to a second important feature of the invention, two-state direct-current signaling information is transmitted over a multichannel pulse code modulation system employing a predetermined number of digit spaces per channel for message transmission not only by adding a further digit space to each channel exclusive of the message digit spaces and transmitting binary "1" in the added digit space in response to one state of a first direct-current signal and binary "0" in response to the other but also by transmitting binary "1" in the least significant message digit space of the channel concerned in response to one state and binary "0" in response to the other of a second direct-current signal. In a revertive pulsing telephone trunk, according to this feature of the invention, one of the signaling paths so provided is used to transmit on-hook or off-hook signals, while the other is used to transmit revertive pulses. Both paths provided rapid signal transmission with a minimum of circuit complexity and the slight increase of noise which takes place within the voice-frequency range with the addition of the second signaling path is made to do so only during the non-commercial portions of a telephone call.

In at least one embodiment of the invention non-interference with voice-frequency messages in the direction back toward the originating office is assured by transmitting binary "1" in the added digit space to designate the presence of battery, transmitting binary "0" in that digit space to designate a short circuit or revertive pulse, forcing the transmission of binary "0" during the least significant digit space to designate normal battery polarity, and permitting binary "1" to be transmitted at least randomly in the least significant message digit to designate battery reversal. Since battery reversal is transmitted from the terminating office as an off-hook signal, the least significant digit space is thus available for message use during the commercial portion of a call. There is some slight performance degradation during an on-hook condition due to in-band noise caused by loss of the least significant digit space, but the channel is used for message transmission at such times only by trained operators who will experience no difficulty because of it.

Other objects and features of the invention will become apparent from the following description of one specific embodiment arranged to provide revertive pulsing between telephone central offices in a multichannel time division multiplex pulse code modulation system. In the drawings.

Figure 1:
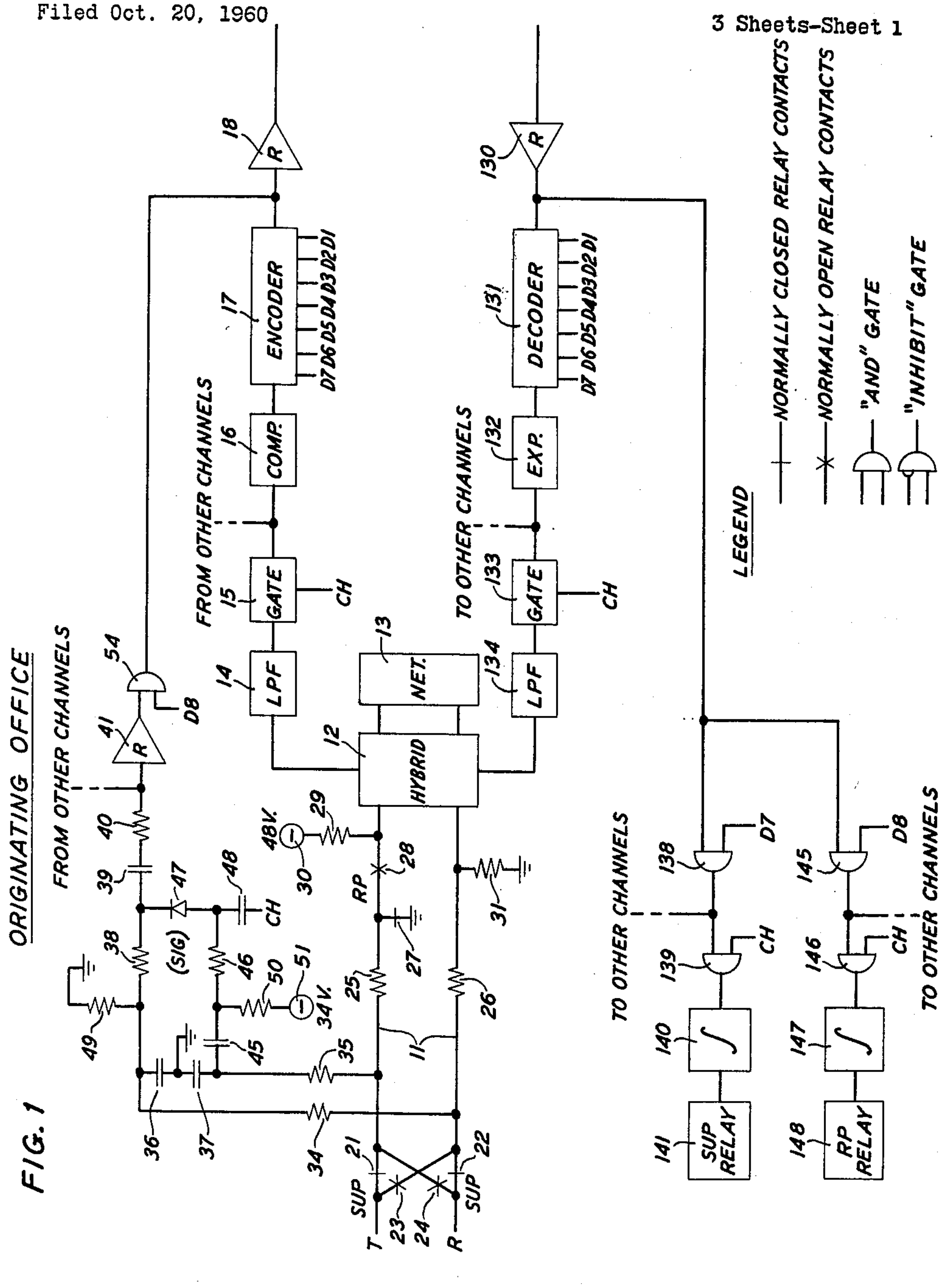
FIG. 1 shows the pulse code modulation equipment used at the originating central office in an embodiment of the invention.
Figure 2:
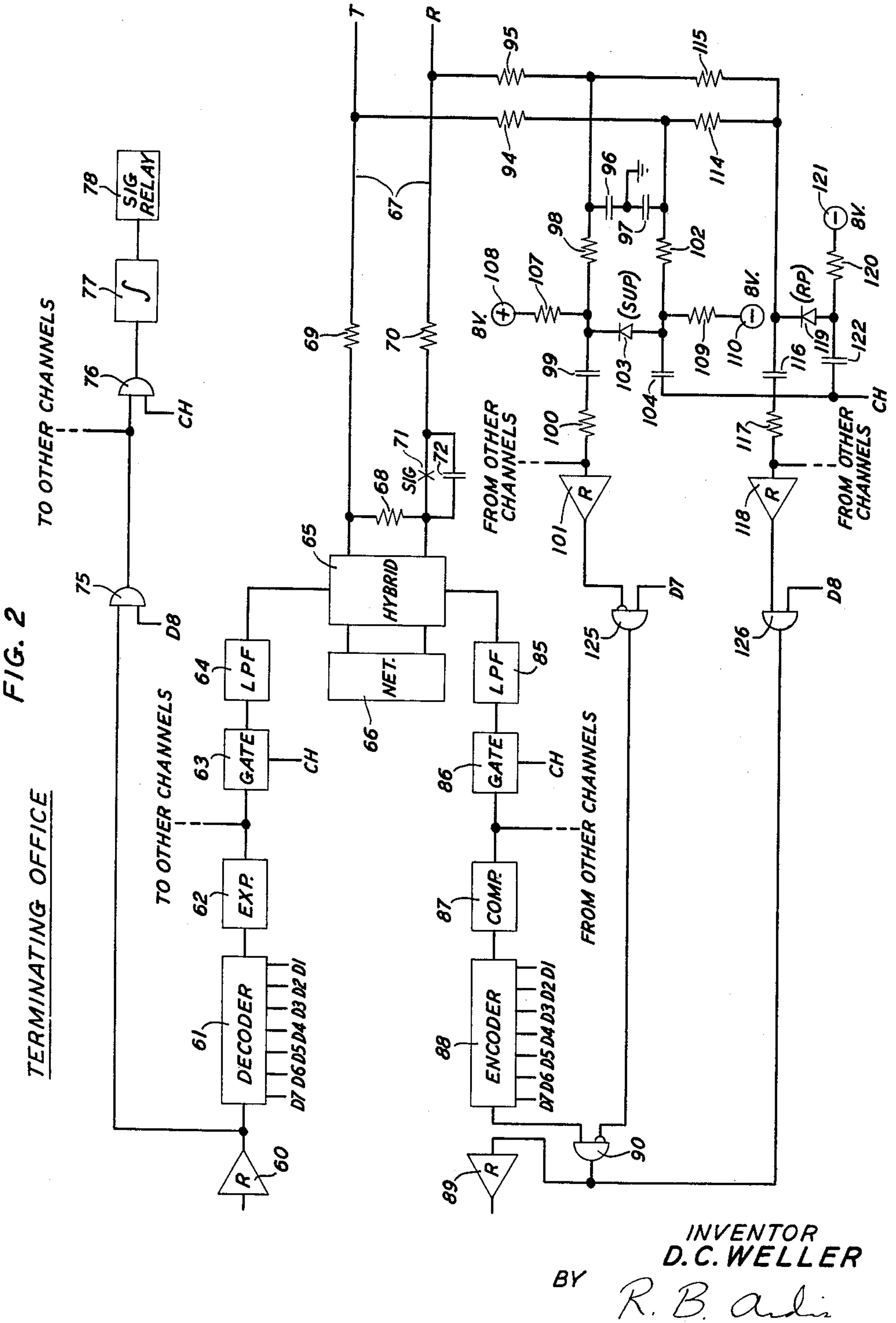
FIG. 2 illustrates the pulse code modulation equipment used at the terminating central office in the same embodiment of the invention.

FIG. 3 illustrates several of the control pulse waveforms used in the embodiment of the invention shown in FIGS. 1 and 2; and FIGS. 4 and 5 are charts showing the operation of the circuitry of FIGS. 1 and 2 under the different signaling conditions required for revertive pulsing.

The multichannel time division multiplex pulse code modulation telephone trunk illustrated in FIGS. 1 and 2 is used to replace a multiplicity of metallic-pair voice-frequency lines between telephone central offices. Only one channel is illustrated in detail at each office, but the points at which the remaining channels are connected are indicated. As shown, this channel terminates in a two-wire voice-frequency line at each central office where it is connected to the usual central office switching equipment. As indicated above, the trunk is equipped for revertive pulsing to illustrate the application of the principles underlying the present invention.

In FIG. 1, the two-wire voice-frequency line 11 from the originating central office is connected to a hybrid network 12 which is, in turn, terminated by a suitable balancing network 13. Transmission beyond hybrid network 12 is on a four-wire basis, with the two directions of transmission separated by the conjugacy of hybrid network 12. The transmitting path from hybrid network 12 takes the form of a low-pass filter 14, a channel sampling gate 15, a compressor 16, a pulse code modulation encoder 17, and a transmitting regenerative pulse amplifier 18. Filter 14 serves to limit the top frequencies of the transmitted voice-frequency messages to 4 kilocycles, for example, and gate 15 is enabled by a so-called channel pulse at an 8 kilocycle rate. As shown in the first four lines of FIG. 3, the channel pulses assigned to each channel are displaced in time from all other channel pulses, with the result that the input applied to compressor 16 is a time-division multiplexed sequence of samples from all of the channels being transmitted. As indicated, samples from the other channels are interleaved with those from gate 15 at the input of compressor 16.

As is now common practice in many multichannel carrier systems, the embodiment of the invention illustrated in FIGS. 1 and 2 is provided with companders in order to improve the signal-to-noise ratio of the system. In each direction of transmission, a compander takes the form of an instantaneous volume compressor at the transmitting terminal followed by a complementary instantaneous volume expander at the receiving terminal. In a pulse code modulation system, the effect of the compander is to increase the percentage of the encoder volume range that is used by low volume messages, thereby reducing the amount of so-called quantizing noise. High volume messages already take full advantage of the encoder range, so they are already transmitted with a minimum amount of quantizing noise.

Compressor 16 in the transmitting path in FIG. 1 is followed by pulse code modulation encoder 17. As shown, encoder 17 is a seven-digit encoder. It employs seven message digits per channel in the time scale, in other words, to translate each compressed sample applied to it into a binary code group of marks (binary "1") and spaces (binary "0") occupying seven consecutive digit spaces or time slots. To control the timing of encoder 17, timing pulses which recur during the same numbered time slot of each code group are applied to the timing control leads D1 through D7. As shown in the fifth line of FIG. 3, the D1 lead is energized during the first time slot or digit space of each code group and controls the timing of the generation of the marks or spaces in the most significant digit space. As shown in the sixth line of FIG. 3, the D7 lead is energized during the seventh time slot of each code group and controls the timing of the generation of the marks or spaces in the least significant digit space. The D2 through D6 leads are energized in a similar manner during their respective digit spaces or time slots. Encoder 17 may, by way of example, take the form of the network type of encoder disclosed in application Serial No. 744,190, which was filed June 24, 1958 by R. E. Yaeger.

The transmitting regenerative pulse amplifier 18 is connected to receive the multiplexed binary code groups generated by encoder 17 and serves to insure uniformity of pulses for transmission over the trunk to the receiving equipment at the terminating central office.

The portion of the originating office transmitting circuitry which has thus far been described is conventional at the present stage of development of the pulse code modulation art. The remaining transmitting circuitry illustrated in FIG. 1 is, in accordance with the invention, provided to furnish a high-speed signaling path from the originating office to the terminating office and to complete the two signaling paths directed from the terminating office back toward the originating office.

Near the left-hand end of two-wire voice line 11 in FIG. 1, normally closed relay contacts 21 and 22 are connected in series in the tip and ring sides (marked T and R, respectively) of the line. Cross-connections between the tip and ring sides of the line contain normally open relay contacts 23 and 24. These relay contacts, as will be explained later, belong to a so-called SUP (for supervisory) relay controlled from the terminating office and are used to reverse battery polarity on line 11 in response to an off-hook signal. Farther to the right, resistors 25 and 26 are connected in series with the tip and ring sides of the line, respectively. Still farther to the right, relay contacts 27, which are open when their relay is operated, ground the tip side of the line and relay contacts 28, which are closed when the same relay is operated, connect the tip side of the line to hybrid 12 and through a resistor 29 to a negative 48-volt source 30. Relay contacts 27 and 28 belong to a so-called RP (for revertive pulse) relay controlled from the terminating office and are used to connect a substantially short circuit across the line to reconstruct revertive pulses. To the right of resistor 26, the ring side of the line is connected to hybrid 12 and is grounded through a small resistor 31. Resistors 25, 26, 29, and 31 form an impedance matching pad while relay contacts 27 are open and relay contacts 28 are closed. As will be explained later, this is the normal condition of the RP relay. During a revertive pulse, however, contacts 27 are closed, contacts 28 are open, and the resistors simulate the impedance of a direct two-wire metallic trunk.

The high-speed signaling path to the terminating office afforded by the invention begins just to the left of resistors 25 and 26, where a pair of isolating resistors 34 and 35 are connected to the ring and tip sides of the line, respectively. A pair of capacitors 36 and 37 are connected to ground from the other ends of isolating resistors 34 and 35 to prevent any stray alternating-current components from adversely affecting the performance of the signaling path. The end of isolating resistor 34 is also connected through the series combination of a resistor 38, a blocking capacitor 39, and a resistor 40 to a regenerative pulse amplifier 41, while the end of isolating resistor 35 is also connected through the series combination of a blocking capacitor 45, a resistor 46, and a diode 47 to the junction between resistor 38 and capacitor 39. Diode 47 is poled for easy current flow toward the junction between resistor 38 and capacitor 39 and is a switch which operates to control a so-called SIG (for signaling) relay at the terminating office. The junction between resistor 46 and diode 47 is connected through a blocking capacitor 48 to the same source of channel pulses that drives sampling gate 15. To complete the circuit, the junction of resistors 34 and 38 is returned to ground through a resistor 49, and that of capacitor 45 and resistor 46 is returned through a resistor 50 to a negative 34-volt source 51. Similar signaling path circuitry in other channels is connected into the common transmitting path at the input side of regenerative pulse amplifier 41, and the output of amplifier 41 is connected through an AND gate 54 to the input side of transmitting amplifier 18. An AND gate, as is well known, is enabled only when all of its input leads are energized. AND gate 54 is, in acordance with an important feature of the invention, supplied at its other input lead with digit pulses during an eighth digit space assigned to each channel. This eighth digit space is, as has already been pointed out, exclusive of the digit spaces used in each channel for message transmission and its use for the transmission of direct-current signaling information does not, therefore, detract from the quality of voice-frequency message transmission. The only cost of the additional digit space is approximately fifteen percent in additional bandwidth. The eighth-digit control pulses are shown in the seventh line of FIG. 3.

The signaling circuitry which has just been described is the SIG detector and monitors two-wire line 11 to determine whether or not current is flowing. When the originating office is idle, the office end of line 11 is open circuited and no current flows. Under such conditions, diode 47 is back biased by negative 34-volt source 51 and transmission of channel pulses to the input of pulse amplifier 41 is blocked. When the originating office is busy, on the other hand, the office end of line 11 is short circuited and negative 48-volt source 30 forward biases diode 47, permitting channel pulses to reach amplifier 41. As will be explained later, the relay controlling contacts 27 and 28 is operated except when a revertive pulse is being transmitted and, except during such intervals, negative 48-volt source 30 is connected to the line. With the addition of AND gate 54, binary "1" is thus transmitted during the eighth digit space in any channel in response to a busy or closed loop condition and binary "0" is transmitted during the eighth digit space in response to an idle or open loop condition. This operation is tabulated for easy reference in FIG. 4.

The message and signaling receiving circuitry at the other end of the carrier line is illustrated in FIG. 2. There, a receiving regenerative pulse amplifier 60 recovers and regenerates the pulse pattern transmitted by amplifier 18 in FIG. 1. The output of receiving amplifier 60 is passed through a pulse code modulation decoder 61 which may, for example, be the type disclosed in United States Patent 2,991,422, issued July 4, 1961, to R. E. Yaeger. Control pulses are supplied to decoder 61 during digit spaces D1 through D7 in each channel to control decoder timing. The output of decoder 61 is passed through an expander 62 and the output of the latter is in the form of the same succession of message samples as applied to compressor 16 in FIG. 1. Message distribution to each of the receiving channels takes place at that point.

In the illustrated receiving channel, the output side of expander 62 is connected through a channel gate 63 and a low-pass filter 64 to a hybrid network 65. The channel pulses of the channel concerned are applied to channel gate 63 to separate the message samples of this channel from those of others. The channel pulses for the first four channels are, it will be recalled, illustrated in the first four lines of FIG. 3. Low-pass filter 64 removes the high-frequency components from the message samples for this particular channel and restores the message to its original form. Hybrid 65 is terminated by a balancing network 66.

To the right of hybrid network 65, transmission is once again on a two-wire basis through a transmission line 67. A small resistor 68 is connected between the tip and ring sides of the two-wire line 67 just to the right of hybrid network 65 to provide direct-current continuity, and a pair of small resistors 69 and 70 are connected in series with the tip and ring sides of line 67, respectively, to form, with resistor 68, an impedance matching pad and to simulate the impedance of a metallic pair.

The portion of the terminating office receiving circuitry which has been described is largely conventional. The remaining receiving circuitry is, in accordance with the invention, provided to complete the high-speed signaling path from the originating office.

Between resistors 68 and 70, a pair of normally open relay contacts 71 are connected in series with the ring side of line 67. These contacts belong to a so-called SIG (for signaling) relay and are used to create open and closed loop conditions on line 67 in response to idle or busy signals received from the originating office. Relay contacts 71 are bypassed by a capacitor 72 to provide a voice-frequency transmission path when they are in their open condition.

The exclusively signaling circuitry in FIG. 2 begins at the right of receiving amplifier 60, where one input lead of an AND gate 75 is connected to the line. The other input lead of AND gate 75 is, in accordance with a feature of the invention, supplied with digit pulses during the eighth digit space assigned to each channel. For the channel illustrated, the output lead of AND gate 75 is connected through another AND gate 76 (which is controlled by channel pulses) and an integrating circuit 77 to a SIG (for signaling) relay 78. This circuitry is the SIG regenerator and, as shown in FIG. 4, serves to operate relay 78 in response to binary "1" received during the eighth digit space and to release it in response to binary "0" received during the eighth digit space. The function of integrating circuit 77 is to build up sufficient current to provide rapid operation of relay 78 and to hold its state of operation between successive driving digit pulses.

Relay contacts 71 in FIG. 2 are the contacts of SIG relay 78. As indicated in FIG. 4, they are open in the presence of binary "0" in the eighth digit space, thus recreating an open loop condition on line 67 as an idle signal. They are closed in the presence of binary "1" in the eighth digit space, recreating a closed loop condition as a busy signal. The direct-current signaling state recreated on line 67 is, therefore, substantially identical to the one originally appearing on two-wire line 11 in FIG. 1, permitting switching equipment at both central offices to operate just as if no pulse code modulation system intervened. This is accompanied, moreover, with a maximum of speed and precision and with a minimum of added circuit complexity.

The pulse code modulation equipment in the direction from the terminating office to the originating office is substantially the same as that in the opposite direction which has already been described. A low-pass filter 85 is connected to hybrid network 65 and is isolated from filter 64 in the receiving path by the conjugacy of hybrid network 65. Beyond filter 85 in the transmitting path are a channel gate 86, a compressor 87, and a pulse code modulation encoder 88. Other channels are multiplexed for transmission at the input side of compressor 87. The output of encoder 88 is, for reasons which will be explained later, connected to a transmitting regenerative pulse amplifier 89 through an INHIBIT gate 90. Such a gate is disabled whenever its INHIBIT terminal (indicated by the smaller semi-circle in the symbol) is energized.

As has already been explained, the present invention provides two high-speed signaling paths from the terminating office back to the originating office. As shown in tabular form in FIG. 5, these paths are used to transmit on-hook or off-hook signals and to transmit revertive pulses.

At the terminating office, as shown in FIG. 2, the signaling states supplied by the central office switching equipment to two-wire line 67 are monitored by a pair of detectors. One of these, the SUP (for supervisory) detector, detects battery polarity while the other, the RP (for revertive pulse) detector, detects ground pulses.

Near the right-hand end of two-wire line 67 in FIG. 2, a pair of isolating resistors 94 and 95 are bridged across the line, with resistor 94 connected to the tip side and resistor 95 connected to the ring. A pair of capacitors 96 and 97 are connected to ground from the other ends of resistors 94 and 95 to bypass stray alternating-current components and keep them from affecting the performance of the two detectors. The end of resistor 95 is also connected through the series combination of a resistor 98, a blocking capacitor 99, and a resistor 100 to a regenerative pulse amplifier 101, while the end of resistor 94 is also connected through a resistor 102 and a diode 103 to the junction between resistor 98 and capacitor 99. Diode 103 is poled for easy current flow toward the junction between resistor 98 and capacitor 99 and serves as a switch, the action of which ultimately controls a so-called supervisory relay at the originating office. The junction between resistor 102 and diode 103 is connected through a blocking capacitor 104 to the same source of channel pulses that drives sampling gate 86. The circuit is completed by a resistor 107 returned to a positive 8-volt source 108 from the junction between resistor 98 and capacitor 99 and by a resistor 109 returned to a negative 8-volt source 110 from a junction between resistor 102 and diode 103.

Another pair of isolating resistors 114 and 115 are also connected to the ends of resistors 94 and 95, respectively. The other ends of resistors 114 and 115, however, are joined together and connected through a blocking capacitor 116 and a resistor 117 to a regenerative pulse amplifier 118. The junction between resistors 114 and 115 is also connected through a diode 119 and a resistor 120 to a negative 8-volt source 121. Diode 119 is poled for easy current flow in the direction toward resistors 114 and 115 and the junction between diode 119 and resistor 120 is supplied with channel pulses through a blocking capacitor 122.

The detector circuits shown in FIG. 2 are completed by an INHIBIT gate 125 and an AND gate 126. The former has its INHIBIT terminal supplied from the output of regenerative pulse amplifier 101 and its remaining input terminal supplied with pulses during the seventh digit space of each channel. The output of INHIBIT gate 125 is supplied to the INHIBIT terminal of INHIBIT gate 90. AND gate 126, on the other hand, has one input terminal supplied by the output of regenerative pulse amplifier 118 and the other supplied with pulses during the eighth digit space of each channel. The output of AND gate 126 is supplied to the input side of transmitting regenerative pulse amplifier 89.

The signaling circuitry which has just been described makes up the SUP (for supervisory) and RP (for revertive pulse) detectors. These detectors monitor two-wire line 67 both to determine whether or not current is flowing and to determine the direction of current flow. When the central office switching equipment supplies a revertive pulse to line 67, the tip and ring sides of the line are shorted to one another and no current flows. Current flows in line 67 at all other times, the direction of flow depending upon whether an on-hook or off-hook condition is present.

In the absence of a revertive pulse, the central office switching equipment applies a direct voltage, termed battery, to two-wire voice line 67 in FIG. 2. For an on-hook condition, so-called normal battery is applied. In this condition, the tip side of the line is held at a negative 48-volt potential while the ring side is grounded. The SUP diode 103 is back biased, blocking channel pulses from the INHIBIT lead of gate 125. Gate 125 passes digit pulses during the seventh or least significant message digit space, under such conditions, to the INHIBIT lead of gate 90. Gate 90 blocks transmission from encoder 88 by forcing the transmission of binary "0" (or in other words, by forcing the transmission of a space) during the seventh digit space, as shown in tabular form in FIG. 5. An on-hook condition is, in accordance with an important feature of the invention, thus indicated by the forced transmission of binary "0" during the seventh or least significant message digit space. Since six digit spaces are still available for message transmission, an operator may, if necessary, talk in an on-hook condition with but a slight loss in transmission quality. Such loss in transmission quality can never take place during the commercial portion of a call. The second signaling path provided by the invention does not, therefore, have any adverse effect upon the transmission quality of the system as used by subscribers.

Because isolating resistors 114 and 115 are connected together, their junction with RP diode 119 is held at a negative 24-volt potential under normal battery conditions and diode 119 is forward biased, permitting channel pulses to pass to AND gate 126. AND gate 126 thus passes pulses to transmitting amplifier 89 during the eighth or added digit space, as shown in FIG. 5, indicating the absence of a revertive pulse.

For an off-hook condition, the terminating central office equipment reverses the battery polarity applied to two-wire line 67. The ring side of the line is held at a negative 48-volt potential, while the tip side is grounded. The SUP diode 103 is then forward biased and channel pulses can pass through amplifier 101 to the INHIBIT lead of gate 125. The seventh or least significant message digits are inhibited by gate 125. Gate 90 is, therefore, not inhibited during the seventh digit space by pulses at its INHIBIT lead and any pulses generated in the seventh digit space by encoder 88 pass freely to transmitting regenerative pulse amplifier 89. When a channel is not in use, there is normally enough random noise on the line to cause encoder 88 to generate binary "1" randomly in the seventh digit space. When a channel is in use, as it normally is in the off-hook condition, such noise plus the transmitted message ensures at least the random presence of binary "1" in the seventh or least significant message digit space. As tabulated in FIG. 5, therefore, an off-hook condition is indicated by the random presence of binary "1" in the seventh or least significant message digit space of the channel concerned. The invention thus permits full use of all seven message digit spaces in the off-hook condition or, in other words, during the commercial portion of a call. Binary "1" is transmitted during the eighth or added digit space, as before, indicating the absence of a revertive pulse.

In general, revertive pulsing takes place only while the terminating office is in an on-hook condition or, in other words, while the ring side of two-wire line 67 is grounded and the tip side is connected to negative 48-volt battery. In the absence of a revertive pulse, the junction between resistors 114 and 115 is, as has already been pointed out, at approximately a negative 24-volt potential. The RP diode 119 is forward biased and channel pulses are passed to regenerative pulse amplifier 118. When the central office switching equipment applies a revertive pulse to two-wire line 67, the tip side of the line is grounded and the junction between resistors 114 and 115 is at substantially ground potential. This reverse biases RP diode 119 and blocks channel pulses from regenerative pulse amplifier 118. Binary "0," rather than binary "1," is therefore transmitted during the eighth or added digit space of the channel concerned. The symmetrical connection of RP diode 119 to the tip and ring sides of line 67 makes operation of diode 119 independent of longitudinal line noise.

As shown in FIG. 1, the pulse code modulation message transmission path is completed at the originating office by a receiving regenerative pulse amplifier 130 connected to hybrid network 12 through the series combination of a pulse code modulation decoder 131, an expander 132, a channel gate 133, and a low-pass filter 134. These components are substantially identical to the corresponding components at the terminating office shown in FIG. 2 and will not be redescribed.

To complete the two signaling paths provided by the invention, the originating office equipment shown in FIG. 1 employs two signaling regenerators, both connected to the incoming line at the output side of receiving amplifier 130. Both regenerators closely resemble the SIG regenerator shown in FIG. 2. The first of these, termed the SUP (for supervisory) regenerator, is a tandem chain made up of a pair of AND gates 138 and 139, an integrating circuit 140, and a slow-release SUP relay 141. As indicated in FIG. 1, SUP relay 141 controls polarity-reversing contacts 21 through 24 in two-wire line 11. AND gate 138 is driven by digit pulses during the seventh or least significant message digit of each channel, while AND gate 139 is driven by the channel pulses of the channel concerned. Corresponding channel gates to other channels are also connected to the output side of AND gate 138. Integrating circuit 140 functions similarly to integrating circuit 77 in FIG. 2 but has a longer time constant since binary "1" is only randomly present in the seventh message digit space during transmission of an off-hook signal from the terminating central office. SUP relay 141 is a slow-release relay for the same reason.

The final originating office signaling regenerator is the RP (for revertive pulse) regenerator. It is made up of an AND gate 145 connected in series with an AND gate 146, an integrating circuit 147, and a RP relay 148. This regenerator is like the SUP regenerator except that AND gate 145 is driven by digit pulses during the eighth or added digit space and integrating circuit 147 has the shorter time constant of integrating circuit 77 in FIG. 2. As indicated in FIG. 1, RP relay 148 controls relay contacts 27 and 28 in two-wire line 11.

The SUP and RP regenerators operate to reproduce on two-wire line 11 at the originating office substantially the identical direct-current signaling information supplied to two-wire line 67 at the terminating office by the local central office switching equipment. The manner in which this is done is tabulated in FIG. 5. Thus, when two-wire line 67 is on-hook at the terminating office, the originating office equipment illustrated in FIG. 1 receives binary "0" in the seventh or least significant message digit space and binary "1" in the eighth or added digit space. The binary "0" in the seventh digit space leaves relay contacts 21 and 22 closed and relay contacts 23 and 24 open, while the binary "1" in the eighth digit space opens contacts 27 and closes contacts 28. The condition thereby reconstructed on two-wire line 11 is substantially identical to that detected at the terminating office, namely, a negative 48-volt potential on the tip side of the line and ground on the ring.

Binary "0" is received during the eighth digit space when a revertive pulse is detected at the terminating office. Such signals close RP relay contacts 27 and open RP relay contacts 28, providing a substantial short circuit between the ring and tip sides of two-wire line 11.

Finally, when two-wire line 67 goes off-hook at the terminating office, the originating office equipment receives binary "1," at least randomly, during the seventh digit space of the channel concerned and binary "1" during the eighth digit space. Operation of SUP relay 141 by random seventh digit pulses opens contacts 21 and 22 and closes contacts 23 and 24, effectively reversing the polarity of the direct voltage on two-wire line 11. The ring side of the line is thus connected to a negative 48-volt potential and the tip side is grounded. As before, the pulse during the eighth digit space opens RP relay contacts 27 and closes RP relay contacts 28.

It is to be understood that the above-described arrangement is illustrative of the application of the principles of the invention. Numerous other arrangements may be devised by those skilled in the art without departing from the spirit and scope of the invention.

What is claimed is:

1. In a pulse code modulation message transmission system interconnecting a pair of terminals and employing regularly recurring code groups each containing a predetermined number of successive digit spaces of substantially equal time duration for message transmission, an arrangement for transmitting a two-state direct-current signal between said terminals which comprises means for adding a further digit space exclusive of and in sequence with said message digit spaces to each of said code groups, said further digit space having substantially the same time duration as each of said message digit spaces, means for detecting the state of the direct-current signal at one of said terminals, means to transmit one binary state in said added digit space in response to one state of said direct-current signal and the other binary state in response to the other, and means to reconstruct the detected state of said direct-current signal in response to the content of said added digit space at the other of said terminals.

2. In a pulse code modulation message transmission system interconnecting a pair of terminals and employing a predetermined number of digit spaces for message transmission, an arrangement for transmitting a pair of two-state direct-current signals simultaneously in the same direction between said terminals which comprises means for adding a further digit space exclusive of said message digit spaces, means for detecting the state of a first of said direct-current signals at a first of said terminals, means to transmit binary "1" in said added digit space in response to one state of said first direct-current signal and binary "0" in response to the other, means for detecting the state of the second of said direct-current signals at said first terminal, means to transmit binary "1" in the least significant of said message digit spaces in response to one state of said second direct-current signal and binary "0" in response to the other, means to reconstruct the detected state of said first direct-current signal in response to the content of said added digit space at the second of said terminals, and means to reconstruct the detected state of said second direct-current signal in response to the content of the least significant of said message digit spaces at said second terminal.

3. In a pulse code modulation message transmission system interconnecting a pair of terminals and employing a predetermined number of digit spaces for message transmission, an arrangement for transmitting a pair of two-state direct-current signals simultaneously in the same direction between said terminals which comprises means for adding a further digit space exclusive of said message digit spaces, means for detecting the state of a first of said direct-current signals at a first of said terminals, means to transmit a pulse in said added digit space only in response to one state of said first direct-current signal, means for detecting the state of the second of said direct-current signals at said first terminal, means to force transmission of binary "0" in the least significant of said message digit spaces in response to one state of said second direct-current signal, means to permit the presence of binary "1" in the least significant of said message digit spaces in response to the other state of said second direct-current signal, means to reconstruct the detected state of said first direct-current signal in response to the content of said added digit space at the second of said terminals, and means to reconstruct the detected state of said second direct-current signal in response to the content of the least significant of said message digit spaces at said second terminal.

4. In a multichannel pulse code modulation message system interconnecting a pair of terminals and employing a predetermined number of digit spaces per channel for message transmission, an arrangement for transmitting direct-current signaling information over each channel between said terminals which comprises means for adding a further digit space to each channel exclusive of the message digit spaces, means in each channel for detecting the signaling state at one of said terminals, means to transmit one binary state in the added digit space in each channel in response to one signaling state and the other binary state in response to the other, and means to reconstruct the detected signaling state in each channel at the other of said terminals in response to the content of the corresponding added digit space.

5. In a multichannel pulse code modulation message system interconnecting a pair of terminals and employing a predetermined number of digit spaces per channel for message transmission, an arrangement for transmitting a pair of two-state direct-current signals simultaneously in the same direction between said terminals which comprises means for adding a further digit space to each channel exclusive of the message digit spaces, means in each channel for detecting the state of a first of said direct-current signals at a first of said terminals, means to transmit one binary state in said added digit space in each channel in response to one state of said first direct-current signal and the other binary state in response to the other, means in each channel for detecting the state of the second of said direct-current signals, means to transmit one binary state in the least significant of said message digit spaces in each channel in response to one state of said second direct-current signal and the other binary state in response to the other, means to reconstruct the detected state of said first direct-current signal in each channel at the second of said terminals in response to the content of said added digit space, and means to reconstruct the detected state of said second direct-current signal in each channel at said second terminal in response to the content of the least significant of said message digit spaces.

6. In a multichannel pulse code modulation message system interconnecting a pair of terminals and employing a predetermined number of digit spaces per channel for message transmission, an arrangement for transmitting a pair of two-state direct-current signals simultaneously in the same direction between said terminals which comprises means for adding a further digit space to each channel exclusive of the message digit spaces, means in each channel for detecting the state of a first of said direct-current signals at a first of said terminals, means to transmit binary "1" in said added digit space in each channel only in response to one state of said first direct-current signal, means in each channel for detecting the state of the second of said direct-current signals, means to force transmission of binary "0" in the least significant of said message digit spaces in each channel in response to one state of said second direct-current signals, means to permit the presence of binary "1" in the least significant of said message digit spaces in each channel in response to the other state of said second direct-current signal, means to reconstruct the detected state of said first direct-current signal in each channel at the second of said terminals in response to the content of said added digit space, and means to reconstruct the detected state of said second direct-current signal in each channel at said second terminal in response to the content of the least significant of said message digit spaces.

7. In a pulse code modulation telephone system interconnecting a pair of terminals and employing a predetermined number of digit spaces for voice-frequency message transmission, terminating two-wire telephone lines for said system at each of said terminals and an arrangement for transmitting the idle or busy condition of the terminating line at a first of said terminals to the second of said terminals which comprises means for adding a further digit space exclusive of said message digit spaces, means for detecting the idle or busy condition of the terminating line at said first terminal, means to transmit binary "1" in said added digit space in response to a detected busy condition, means to transmit binary "0" in said added digit space in response to a detected idle condition, means for imposing a closed loop condition on the terminating line at said second terminal in response to a received binary "1" in said added digit space, and means for imposing an open loop condition on the terminating line at said second terminal in response to a received binary "0" in said added digit space.

8. In a pulse code modulation telephone system interconnecting a pair of terminals and employing a predetermined number of digit spaces for voice-frequency message transmission, terminating two-wire telephone lines for said system at each of said terminals, an arrangement for transmitting the on-hook or off-hook condition of the terminating line at a first of said terminals to the second of said terminals which comprises means for detecting the on-hook or off-hook condition of the terminating line at said first terminal, means to force transmission of binary "0" in the least significant of said message digit spaces in response to a detected on-hook condition, means to permit the presence of binary "1" in the least significant of said message digit spaces in response to a detected off-hook condition, means for imposing a direct voltage of one polarity on the terminating line at said second terminal in response to received binary "0" in said least significant digit space, and means for imposing a direct voltage of the opposite polarity on the terminating line at said second terminal in response to received binary "1" in said least significant digit space and an arrangement for transmitting revertive pulses from the terminating line at said first terminal to said second terminal which comprises means for adding a further digit space exclusive of said message digit spaces, means for detecting revertive pulses on the terminating line at said first terminal, means to transmit binary "1" in said added digit space in the absence of a detected revertive pulse, means to transmit binary "0" in said added digit space in response to a detected revertive pulse, and means for substantially shorting the direct voltage on the terminating line at said second terminal in response to a received binary "0" in said added digit space.

9. In a multichannel pulse code modulation telephone system interconnecting a pair of central offices and employing a predetermined number of digit spaces per channel for voice-frequency message transmission, separate terminating two-wire telephone lines for each of said channels at each of said central offices, an arrangement for transmitting the idle or busy condition of each of said terminating lines at a first of said central offices to the corresponding terminating line at the second of said central offices which comprises means for adding a further digit space to each channel exclusive of said message digit spaces, means in each channel for detecting the idle or busy condition of the corresponding terminating line at said first central office, means in each channel to transmit binary "1" in said added digit space in response to a detected busy condition, means in each channel to transmit binary "0"in said added digit space in response to a detected idle condition, means in each channel for imposing a closed loop condition on the corresponding terminating line at said second central office in response to a received binary "1" in said added digit space, and means in each channel for imposing an open loop condition on the corresponding terminating line at said second central office in response to a received binary "0" in said added digit space.

10. In a multichannel pulse code modulation telephone system interconnecting a pair of central offices and employing a predetermined number of digit spaces per channel for voice-frequency message transmission, separate terminating two-wire telephone lines for each of said channels at each of said central offices, an arrangement for transmitting the on-hook or off-hook condition of each of said terminating lines at a first of said central offices to the corresponding terminating line at the second of said central offices which comprises means in each channel for detecting the on-hook or off-hook condition of the corresponding terminating line at said first central office, means in each channel to force transmission of binary "0" in the least significant of said message digit spaces in response to a detected on-hook condition, means in each channel to permit the presence of binary "1" in the least significant of said message digit spaces in response to a detected off-hook condition, means in each channel for imposing a direct voltage of one polarity on the corresponding terminating line at said second central office in response to received binary "0" in said least significant message digit space and means in each channel for imposing a direct voltage of the opposite polarity on the corresponding terminating line at said second central office in response to received binary "1" in said least significant message digit space and an arrangement for transmitting revertive pulses from each of said terminating lines at said first central office to the corresponding terminating line at said second central office which comprises means for adding a further digit space to each channel exclusive of said message digit spaces, means in each channel for detecting revertive pulses on the corresponding terminating line at said first central office, means in each channel to transmit binary "0" in said added digit space in response to a detected revertive pulse, means in each channel to transmit binary "1" in said added digit space in the absence of a detected revertive pulse, and means in each channel for substantially shorting the direct voltage on the corresponding terminating line at said second central office in response to a received binary "0" in said added digit space.

References Cited in the file of this patent

UNITED STATES PATENTS

| | | |
|---|---|---|
| 2,438,903 | Deloraine et al. | Apr. 6, 1948 |
| 2,946,044 | Bolgiano | July 19, 1960 |